US010024675B2

(12) United States Patent
Schlesinger et al.

(10) Patent No.: US 10,024,675 B2
(45) Date of Patent: Jul. 17, 2018

(54) ENHANCED USER EFFICIENCY IN ROUTE PLANNING USING ROUTE PREFERENCES

(71) Applicant: MICROSOFT TECHNOLOGY LICENSING, LLC, Redmond, WA (US)

(72) Inventors: Benny Schlesinger, Ramat-HaSharon (IL); Shira Weinberg, Tel Aviv (IL); Yuval Borsutsky, Tel Aviv (IL); Avichai Cohen, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/150,830

(22) Filed: May 10, 2016

(65) Prior Publication Data

US 2017/0328725 A1      Nov. 16, 2017

(51) Int. Cl.
    *G01C 21/34*    (2006.01)
(52) U.S. Cl.
    CPC ..... *G01C 21/3484* (2013.01); *G01C 21/3438* (2013.01); *G01C 21/3461* (2013.01); *G01C 21/3492* (2013.01)
(58) Field of Classification Search
    CPC ............ G01C 21/3484; G01C 21/3492; G01C 21/3461
    See application file for complete search history.

(56) References Cited

U.S. PATENT DOCUMENTS

| 6,175,803 | B1 | 1/2001 | Chowanic et al. |
| 7,363,126 | B1 | 4/2008 | Zhong et al. |
| 7,512,487 | B1 * | 3/2009 | Golding ............. G01C 21/3484 701/424 |
| 8,000,892 | B2 | 8/2011 | Banerjee |
| 8,090,532 | B2 | 1/2012 | Tashev et al. |
| 8,126,641 | B2 | 2/2012 | Horvitz |
| 8,315,792 | B2 | 11/2012 | Speier et al. |

(Continued)

FOREIGN PATENT DOCUMENTS

| DE | 102009047377 A1 | 6/2011 |
| DE | 102014008151 A1 | 12/2015 |

(Continued)

OTHER PUBLICATIONS

US 8,972,170, 03/2015, Dave et al. (withdrawn)

(Continued)

*Primary Examiner* — Anne M Antonucci
(74) *Attorney, Agent, or Firm* — Shook Hardy & Bacon L.L.P.

(57) ABSTRACT

In various implementations, routing factors are identified based on a routing request associated with a user, where the routing factors include route preferences of the user. Routes are generated based on the routing request. Preference weights are determined for the route preferences, where the preference weights correspond to machine learning models based on sensor data provided by one or more sensors in association with the user. Route scores are determined for the routes based on the preference weights. A suggested route is provided to a user device associated with the user, where the suggested route corresponds to a selected route of the routes and is provided based on the route score of the selected route.

20 Claims, 5 Drawing Sheets

(56) References Cited

U.S. PATENT DOCUMENTS

| | | | |
|---|---|---|---|
| 8,352,175 B2 | 1/2013 | Bauchot et al. | |
| 8,589,064 B2 | 11/2013 | Singh | |
| 8,718,925 B2 | 5/2014 | Letchner et al. | |
| 9,008,960 B2 | 4/2015 | Horvitz | |
| 9,031,779 B2 | 5/2015 | Djugash | |
| 9,157,756 B2 | 10/2015 | Mason et al. | |
| 9,384,661 B1* | 7/2016 | DeLuca | G08G 1/096838 |
| 9,605,970 B1* | 3/2017 | Day | G01C 21/3461 |
| 9,709,413 B2* | 7/2017 | Caceres | G01C 21/3492 |
| 2002/0128773 A1 | 9/2002 | Chowanic et al. | |
| 2006/0149461 A1* | 7/2006 | Rowley | G08G 1/096811 |
| | | | 701/423 |
| 2009/0210142 A1 | 8/2009 | Couckuyt et al. | |
| 2014/0358437 A1* | 12/2014 | Fletcher | G01C 21/3484 |
| | | | 701/533 |
| 2015/0160026 A1 | 6/2015 | Kitchel | |
| 2015/0345951 A1* | 12/2015 | Dutta | G01C 21/3605 |
| | | | 701/400 |

FOREIGN PATENT DOCUMENTS

| | | |
|---|---|---|
| JP | 2012189462 A | 10/2012 |
| WO | 2010040386 A1 | 4/2010 |

OTHER PUBLICATIONS

McEntegart, Jane, "Apple Patent Details Navigation System that Maps Routes Based on Cell Phone Signal", Published on: Mar. 4, 2015 Available at: http://mobilesyrup.com/2015/03/04/apple-patent-details-navigation-system-that-maps-routes-based-on-cell-phone-signal/.

Shenpei, et al., "Driver's Route Choice Model Based on Traffic Signal Control", In Proceedings of 3rd IEEE Conference on Industrial Electronics and Applications, Jun. 3, 2008, pp. 2331-2334.

"International Search Report and Written Opinion Issued in PCT Application No. PCT/US2017/030940", dated Nov. 9, 2017, 24 Pages.

\* cited by examiner

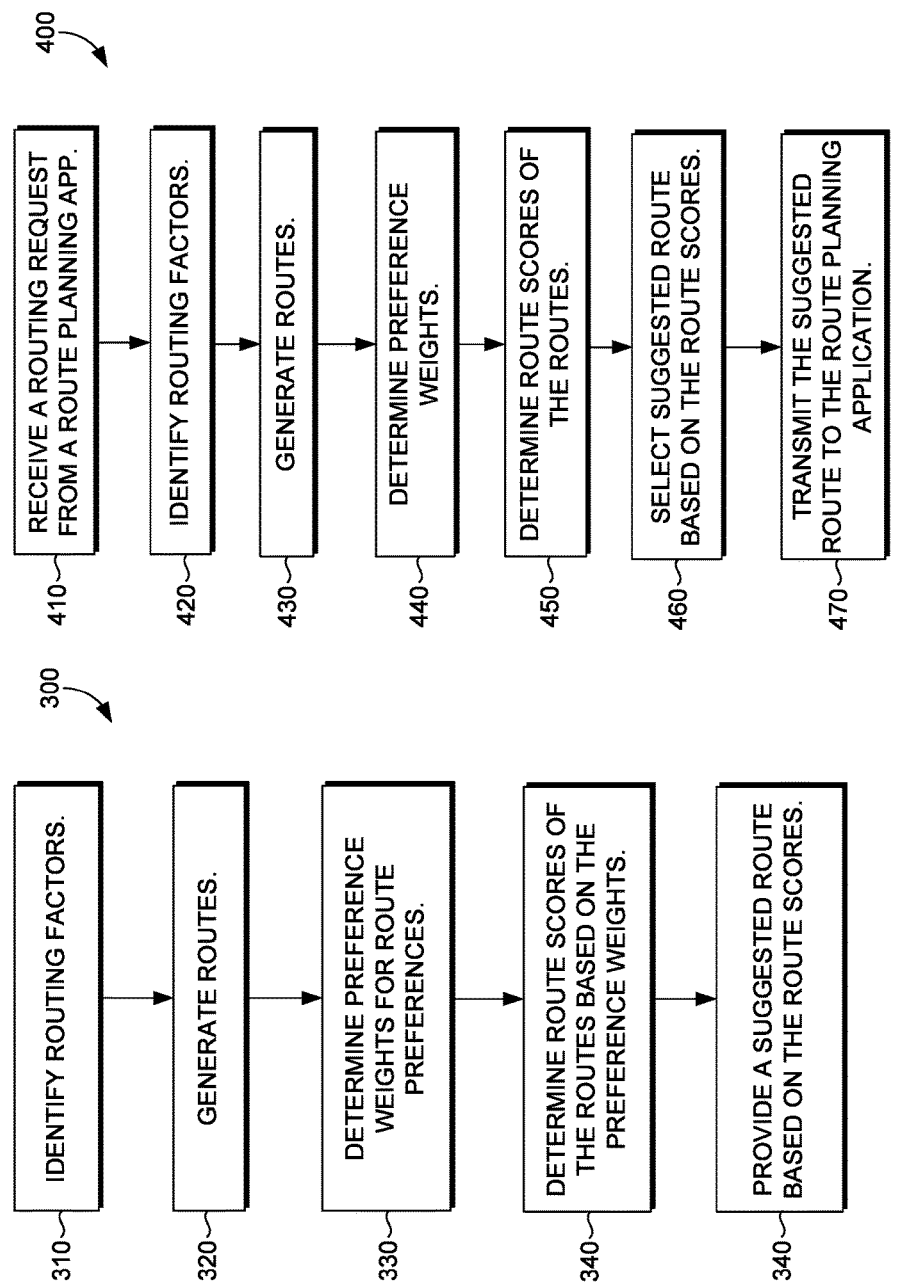

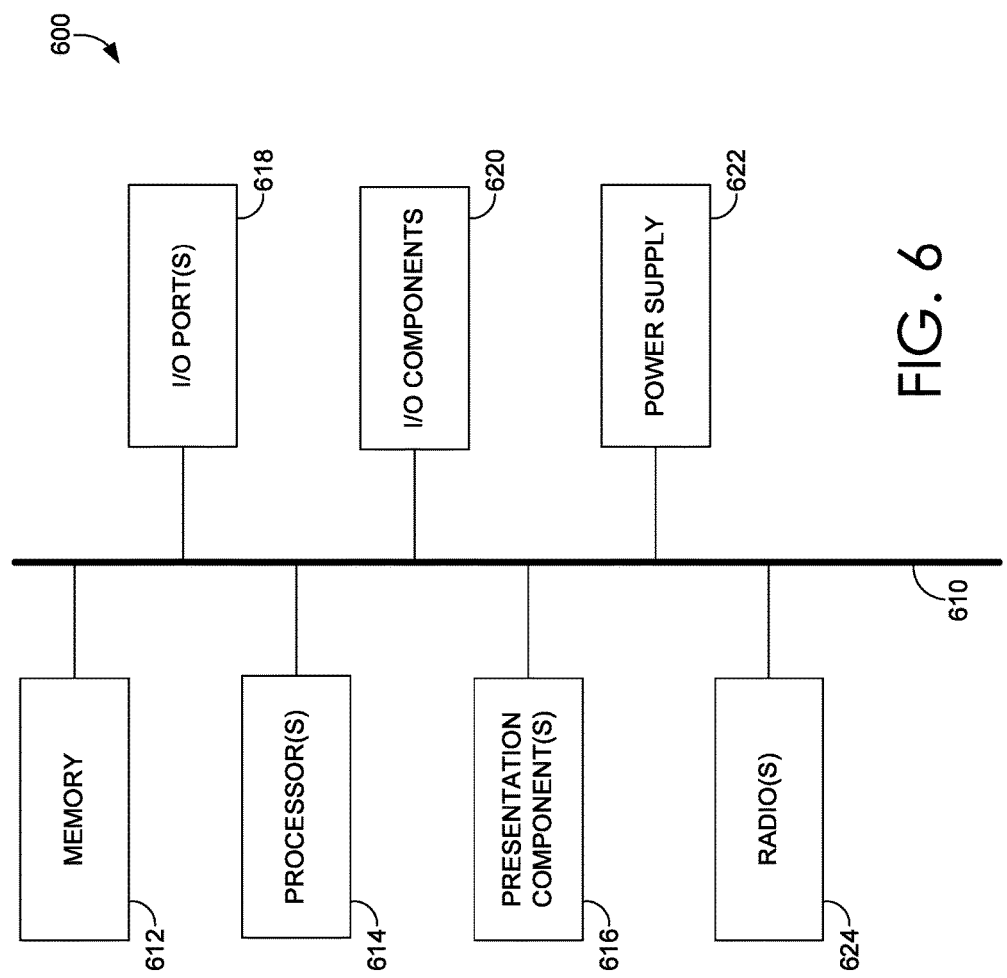

ENHANCED USER EFFICIENCY IN ROUTE PLANNING USING ROUTE PREFERENCES

BACKGROUND

Route planning applications are often used to provide users with directions to points of interest such as particular buildings, addresses, geo-coordinates, and the like. In an example scenario, a user provides a route planning application with at least a beginning location and an ending location (e.g., beginning and ending addresses). The route planning application can analyze representations of roads and intersections to output a route of travel. Conventional route generation algorithms attempt to minimize, or optimize for one of, the total distance of travel or the total time of travel in the routes provided to the user.

Modern route planning applications are built around assumptions of constancy and universality, such that routes provided to users are not optimized for user preferences. While some have basic configurability, they fail to account for trade-offs in preferences users may consider to arrive at an optimal route. An example of such a trade-off is that a driver that typically prefers main roads may be willing to take a side street over a main road in a route when the route is sufficiently more preferable to alternative routes that use the main road. Using conventional approaches, for a user to achieve an optional route requires significant investment of time and resources, such as researching road conditions and manually setting route waypoints.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Aspects of the present disclosure relate to enhancing user efficiency in route planning user route preferences. In accordance with implementations of the present disclosure, route preferences are tracked for individual users. Routes are generated based on a routing request. A preference weight corresponds to a machine learning model that is based on sensor data provided by one or more sensors in association with the user. Route scores of the routes are determined based on the preference weights and a suggested route is provided to the user based on the route scores.

In further respects, the routes may be composed of route components. In generating route scores, route preference subscores can be determined for route components. The route preference subscores can be averaged, or otherwise combined to form route scores. In some cases, route preference subscores are determined by forecasting an estimated time that the user will be traversing the route component. The estimated times can be utilized to more accurately determine the route preference subscores, thereby improving the accuracy of the route scores.

In additional aspects of the present disclosure, a reference route is selected based on an estimated time to travel over the route, the distance of the reference route, or a combination thereof. In some cases, the reference route is selected based on having the lowest estimated time to travel over the route of the routes generated in response to a routing request. A suggested route is compared to the reference route can provided to the user based on the comparison. In some respects, the suggested route is provided based on an estimated time to travel over the suggested route being within a threshold value that is based on the estimated time to travel over the reference route. Routes that exceed the threshold value may be discarded from being provided to the user as suggested routes. Further, in some cases, the reference route is provided to the user as a suggested route, such as where no other route is within the threshold value. These and other concepts are contemplated as being within the scope of the present disclosure.

BRIEF DESCRIPTION OF THE DRAWINGS

The present invention is described in detail below with reference to the attached drawing figures, wherein:

FIG. 3 is a flow diagram showing a method in accordance with implementations of the present disclosure;

FIG. 4 is a flow diagram showing a method in accordance with implementations of the present disclosure;

FIG. 6 is a block diagram of an exemplary computing environment suitable for use in implementations of the present disclosure.

DETAILED DESCRIPTION

Figure 1:
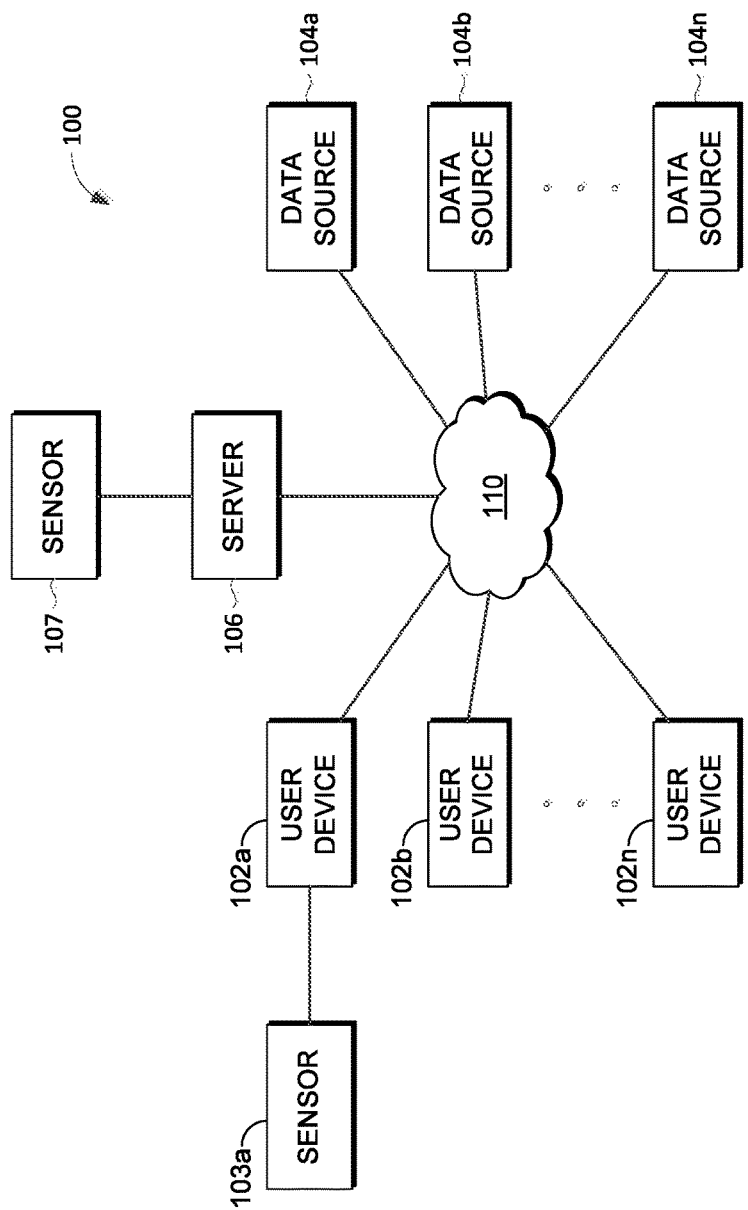
FIG. 1 is a block diagram showing an exemplary operating environment for in accordance with implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present disclosure relate to enhancing user efficiency in route planning user route preferences. In accordance with implementations of the present disclosure, route preferences are tracked for individual users. Routes are generated based on a routing request. A preference weight corresponds to a machine learning model that is based on sensor data provided by one or more sensors in association with the user. Route scores of the routes are determined based on the preference weights and a suggested route is provided to the user based on the route scores. Examples of route preferences include a preference for main route components that are more frequently used by many users, for route components that are more familiar to the user, for safer or less hazardous route components, for route components that have better cellular reception, and for route components that have better weather conditions, such as less windy route components or route components where the user is less likely to have the sun in his or her eyes.

In further respects, in generating route scores, route preference subscores can be determined for route components. The route preference subscores can be averaged, or otherwise combined to form route scores. In some cases, route preference subscores are determined by forecasting an estimated time that the user will be traversing the route component. The estimated times can be utilized to more accurately determine the route preference subscores, thereby improving the accuracy of the route scores.

In additional aspects of the present disclosure, a reference route is selected based on an estimated time to travel over the route, the distance of the reference route, or a combination thereof. In some cases, the reference route is selected based on having the lowest estimated time to travel over the route of the routes generated in response to a routing request. A suggested route is compared to the reference route can provided to the user based on the comparison. In some respects, the suggested route is provided based on an estimated time to travel over the suggested route being within a threshold value that is based on the estimated time to travel over the reference route. Routes that exceed the threshold value may be discarded from being provided to the user as suggested routes. Further, in some cases, the reference route is provided to the user as a suggested route, such as where no other route is within the threshold value.

Using approaches described herein, user efficiency is enhanced in route planning using user preferences by effectively evaluating and predicting optimal routes for users. For example, by incorporating preference weights based on machine learning models, implementations of the present disclosure account for trade-offs in route preferences of users to arrive at optimal routes for the users. Thus, for the users to achieve optimal routes the users need not invest significant time and resources. For example, the users need not research road conditions, predict road conditions, and manually setting route waypoints for every route in a user interface. Additionally, the users need not manually configure a multitude of route preferences or by submitting answers to a questionnaire prior to each route.

Further according to conventional technologies for computer-assisted route planning/navigation, when user preferences are enforced on routes, they are treated as hard constraints. Therefore, these technologies frequently provide routes to users that satisfy the preferences, but are excessively long in terms of duration, distance, or complexity. Some embodiments of the present disclosure solve these and other technological problems by comparing routes to one or more threshold values and/or reference routes to determine whether to provide those routes to users. The threshold values and/or reference routes of the comparisons can constrain the duration, distance, and/or complexity of the routes to filter out deficient routes that are unlikely to be acceptable to users. Thus, contrary to conventional technologies, unacceptable routes that would conventionally be provided to and/or evaluated for users are filtered out (e.g., before or after a route is completely generated). This preserves the computational power that would otherwise be utilized in determining and/or evaluating the deficient routes. Also, in implementations where the filtering is performed server-side, network resources are preserved as they are not wasted on transmitting deficient routes. In additional respects, by filtering the routes, the user interface may be simplified by suggesting fewer routes of highly overall desirability to the user. In at least these ways, embodiments of the present disclosure improve computer-assisted route-planning technology.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107, and network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n may be client devices on the client-side of operating environment 100, while server 106 may be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 9 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. (For example, in one embodiment, one or more data sources 104a through 104n provide (or make available for accessing) user data to data collection component 215 of FIG. 2.) Data sources 104a and 104b through 104n may be discrete from user devices 102a and 102b through 102n and server 106 or may be incorporated and/or integrated into at least one of those components. In one embodiment, one or more of data sources 104a though 104n comprise one or more sensors, which may be integrated into or associated with one or more of the user device(s) 102a, 102b, or 102n or server 106. Some examples of such data sources include sensor 103a or 107, described in FIG. 1. Examples of sensed user data made available by data sources 104a though 104n are described further in connection to data collection component 215 of FIG. 2.

Figure 2:
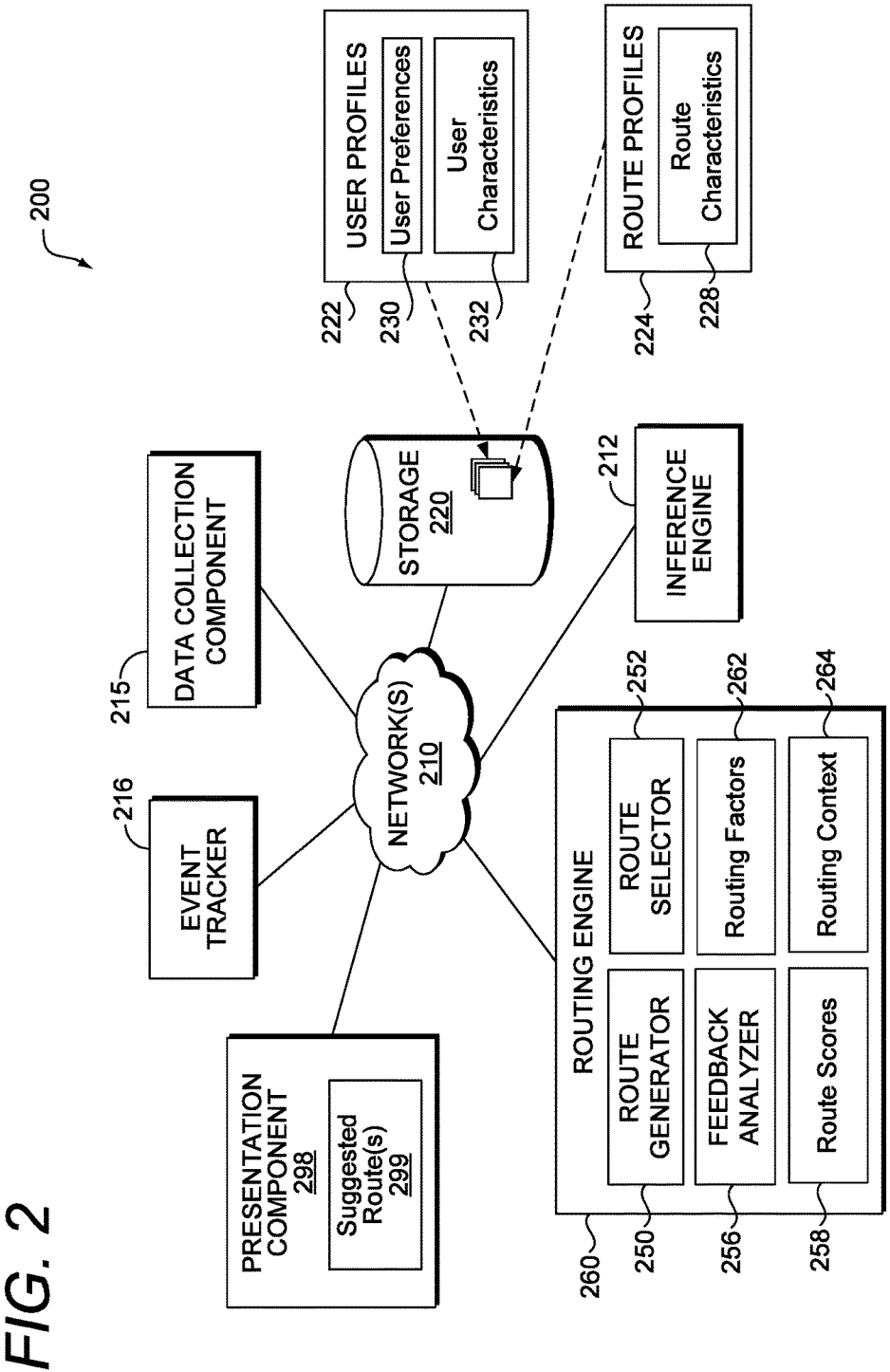
FIG. 2 is a block diagram showing an exemplary system in accordance with implementations of the present disclosure.

Operating environment 100 can be utilized to implement one or more of the components of system 200, described in FIG. 2, including components for collecting user data, monitoring activity events, determining activity patterns, consuming activity pattern information to provide an improving user experience, generating personalized content, and/or presenting notifications and related content to users.

Referring now to FIG. 2, with FIG. 1, a block diagram is provided showing aspects of an example computing system architecture suitable for implementing an embodiment and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

System 200 includes such components as data collection component 215, storage 220, routing engine 260, inference engine 212, and presentation component 298, all of which are communicatively coupled via network 210, which can comprise the same or different network or networks as network 110 of FIG. 1.

In some implementations, the functions performed by components of system 200 are associated with one or more personal assistant, routing, and/or navigation applications, services, or routines. In particular, such applications, services, or routines may operate on one or more user devices (such as user device 102a), servers (such as server 106), may be distributed across one or more user devices and servers, or be implemented in the cloud. Moreover, in some implementations these components of system 200 may be distributed across a network, including one or more servers (such as server 106) and client devices (such as user device 102a), in the cloud, or may reside on a user device such as user device 102a. As with operating environment 100, some of the components described herein may be embodied as a set of compiled computer instructions, computer functions, program modules, computer software services, or an arrangement of processes carried out on one or more computer systems, such as computing device 600 described in connection to FIG. 6.

These components, functions performed by these components, or services carried out by these components may be implemented at appropriate abstraction layer(s) such as the operating system layer, application layer, hardware layer, etc., of the computing system(s). Alternatively, or in addition, the functionality of these components and/or the implementations of the invention described herein can be performed, at least in part, by one or more hardware logic components. Exemplary types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in exemplary system 200, it is contemplated that in some implementations functionality of these components can be shared or distributed across other components.

In general, storage 220 is configured to store computer instructions (e.g., software program instructions, routines, or services), data, and/or models used in implementations of the embodiments described herein. In some implementations, storage 220 stores information or data received via the various components of system 200 and provides the various components of system 200 with access to that information or data. For example, storage 220 may store such information or data as user, route, and interpretive data described with respect to data collection component 215, interaction data, inferential data, semantic information, semantic characteristics, interaction datasets, crowd-sourced datasets, individual-sourced datasets, user routine models, routine-related inferences, routine-related profiles, user profiles (e.g., user profiles 222), and route profiles (e.g., route profiles 224). In implementations, storage 220 comprises a data store (or computer data memory). Although depicted as a single component, storage 220 may be embodied as one or more data stores or may be in the cloud. Further, the information in storage 220 may be distributed in any suitable manner across one or more data stores for storage.

Data collection component 215 is generally responsible for acquiring, accessing, or receiving (and in some cases also identifying) user data, route data, and interpretive data from one or more data sources, such as data sources 104a through 104n of FIG. 1. User data corresponds to data acquired in association with one or more users. When appropriate, user data is collected in an anonymous manner that does not indicate an identity of the user. As used herein, a user may be associated with a user account comprising one or more of a username, a password, a user device (e.g., a media access control address), an Internet Protocol (IP) address, a universally unique identifier (UUID), and/or other user identifiers.

In some cases, at least some user data may not be directly associated with a user account maintained by system 200, but may be associated with another user account that is known or designated to correspond to the same user. For example, a user account may be linked to one or more other user accounts, which may be in another system or other systems. As examples, the same user could have a Microsoft® account, an Amazon.com® account, a Facebook® account, a PayPal® account, a Google® Account, a Twitter® account, a bank account, an eBay® account, and an XBOX Live® account, each of which may be associated with user data of the user.

Route data corresponds to data collected in association with one or more route components used by system 200 to represent routes. A "route" may comprise a set of one or more route components such as roads, road segments, pathways, and/or intersections that span geographic locations. Internally route components may be represented in any suitable manner, such as using a graph with nodes representing intersections and connections between nodes representing road segments. A route component could optionally be divided into multiple subcomponents for analysis and/or tracking purposes. For example a road segment could be divided into multiple sub segments.

Interpretive data corresponds to data utilized to supplement the interpretation of information in system 200. In this regard, any of the various components in system 200 can use the interpretive data to support inferences based on the information available to system 200, such as semantic characteristics and interaction data. Interpretive data can be used by any of the various components of system 200 to provide context to the information to support inferences made in system 200 by inference engine 212. As an example, interaction data (e.g., user data) could indicate that a user was driving erratically, whereas interpretative data can comprise weather information utilized by inference engine 212 to infer that the user was driving in a snowstorm. The types of inferences are applicable throughout the present application.

The data acquired by data collection component 215, including user data, route data, and interpretative data, can be collected by data collection component 215 from a variety of sources in which the data may be available in a variety of formats. Examples of user or route data include data derived from one or more sensors which may correspond to any of data sources 104a through 104n of FIG. 1. As used herein, a sensor may include a function, routine, component, or combination thereof for sensing, detecting, or otherwise obtaining information such as user data or route data, and may be embodied as hardware, software, or both. By way of example and not limitation, the user or route data may include data that is sensed or determined from one or more sensors (referred to herein as "sensor data"), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other user-data associated with communication events; etc.) including user activity that occurs over more than one user device, user history, session logs, application data, contacts data, calendar and schedule data, notification data, social-network data, news (including popular or trending items on search engines or social networks), online gaming data, ecommerce activity (including data from online accounts such as a Microsoft account, Amazon.com, eBay, PayPal, or Xbox Live), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, payment or credit card usage data (which may include information from a user's PayPal account), purchase history data (such as information from a user's Amazon.com or eBay account), other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, Cellular network, or IP address data), and nearly any other source of data that may be sensed or determined as described herein.

In some respects, at least some of the data may be provided as input signals to the various components of system 200. An input signal can correspond to a feed of data from a corresponding source or sensor, such as any of the various sources or sensors described above. A user signal may refer to an input signal that comprises a feed of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. Similarly, a route signal may refer to a feed of route data from a corresponding data source. For example, a route signal could be from a thermometer, a Rich Site Summary (RSS) document, a Twitter user, a barometer, a website, or other data sources.

It should be appreciated that in some cases user data can also be used as route data. As an example, suppose a cellular phone associated with a user provides user data from a gyroscope in the device. Inference engine 212 may utilize this information as user data to infer that the user was in an accident. Inference engine 212 may use this data on the aggregate to infer that a particular route component (e.g., road segment) corresponds to a high accident area.

In some aspects of the present disclosure, the user data includes interaction data, which may be received from a plurality of user devices (such as user devices 102a through 102n of FIG. 1) associated with a user or in some instances, associated with multiple users. In this way, user activity of a particular user from multiple user devices used by the user (e.g. the user's mobile phone, laptop, tablet, etc.), may be received as interaction data. Interaction data may be received, acquired, or accessed, and optionally accumulated, reformatted and/or combined, by data collection component 215 and stored in one or more data stores such as storage 220. For example, at least some interaction data may be stored in or associated with one of user profiles 222, as described herein. The one or more data stores may thus be made available to routing engine 260, event tracker 216, inference engine 212, and presentation component 298.

In some implementations, data collection component 215 is configured to accumulate interaction data reflecting user activity detected by one or more sensors for an individual user ("individual-sourced interaction data"). In some implementations, data collection component 215 is configured to accumulate interaction data associated with user-source interactions for a plurality of users ("crowd-sourced interaction data"). Any personally identifying data (i.e., interaction data that specifically identifies particular users) may either not be uploaded from the one or more data sources with interaction data, may not be permanently stored, and/or may not be made available to routing engine 260, event tracker 216, inference engine 212, and/or presentation component 298. At least some of the interaction data may be processed to generate user profiles 222 and/or route profiles 224, described in further detail below.

Interaction data may be received from a variety of sources where the data may be available in a variety of formats. For example, in some implementations, user data accumulated by data collection component 215 is received via one or more sensors associated with user devices (such as user device 102*a* and/or other devices associated with the user), servers (such as server 106), and/or other computing devices.

The user data, route data, and interpretive data may be continuously collected over time by a large variety of possible data sources and/or data systems. It is intended that the collection and accumulation of user data and route data embody robust privacy and data protection for individuals, businesses, and public-sector organizations. In this respect, users are given control over many aspects related to associated data, including the ability to opt in or opt out of data collection and/or any of the various tracking or analysis features described herein. Furthermore, safeguards are to be implemented to protect sensitive data from access by other parties, including other users, without express consent of the user or account administrator. Additionally, any data that is collected is intended to be made anonymous, whenever possible.

In addition to acquiring the data from the data sources, data collection component 215 can extract semantic information such as explicit and/or inferred semantic characteristics of users, routes, and/or route components from any combination of user data, route data, or other data that may be included in the acquired data. Extracted semantic characteristics of users may be stored in association with one or more user profiles, such as user profiles 222. User characteristics 232 can correspond to these semantic characteristics. User characteristics comprise any information that is descriptive of users. Each user may have a corresponding user profile and user characteristics associated with that user.

Extracted semantic characteristics of route or route components, may be stored in association with one or more route profiles, such as route profiles 224. Route characteristics 228 can correspond to these semantic characteristics. Route characteristics comprise any information that is descriptive of one or more route components and/or portions thereof. For example, route characteristics for a route component could include a name of a road or roads that correspond to the component, a category or categories of the component, and semantic, inferred, or defined characteristics of the component (e.g., seasonal weather conditions, lane merge information, accident frequency, and many more). Each route component may have a corresponding route profile and route characteristics associated with that route component.

Examples of semantic characteristics (these can provide context to route planning as later described in further detail) include routine characteristics of a user, a route, and/or a route component (e.g., a geographic area). A routine characteristic corresponds to a semantic characteristic that is routine, common place, or regular for the location or user. Routine characteristics may optionally be inferred using event tracker 216 and/or inference engine 212 (e.g., this user often travels in this particular road or this location is near fast food restaurants, or it typically rains at this location). A sporadic characteristic can correspond to a characteristic of a location or a user that is irregular, occasional, or isolated for a location or a user.

Whether a characteristic is a routine characteristic or a sporadic characteristic may depend on the perspective, understanding, and knowledge of the system. For example, routine characteristics and sporadic characteristic can both be types of inferred characteristics that are discovered by the system. A routine characteristic can be a characteristic that is determined by the system as being part of a routine that is detected and tracked by the system (e.g., venue visits, visitation patterns, and/or behavior patterns, or routines). A sporadic characteristic can be a characteristic that is determined by the system, but not as being part of a known routine practiced by a location or user that is detected and tracked by the system (e.g., an event that is not part of a known practiced routine vs. an event that may or may not be part of a known practiced routine). In some cases, a sporadic or routine characteristic may be inferred from multiple characteristics, which can include at least one routine characteristic or sporadic characteristic.

Some examples of routine characteristics of a user include user preferences, such as cuisine preferences, brand preferences, road preferences, driving preferences, movie preferences, music preferences, parental status (i.e., whether the user is a parent), demographic information (e.g., age, gender, marital status, the user being engaged to be married, the user being married, the user being single, literacy/education, employment status, occupation, residence location), routinely visited venues (e.g., user hubs), and many more. Examples of sporadic characteristics of a user include the user being sick, the user craving fast food, the user being late for work, the user diverging from or contradicting an expected tracked routine, the user being on vacation (a user being on vacation may have a higher preference for more scenic routes than otherwise), specific personal events of the user, such as a wedding (a user that has an event to attend may have a stronger preference for fast routes), and many more.

Examples of routine characteristics of a location (e.g., a route or route component) include a type or utility category (e.g., a highway, a freeway, a dirt road a surface street, a bike trail, a walking trail, etc.), traffic conditions on at a particular time of day, ongoing constructions, a presence of lane merges, peak traffic times at the location, aggregate or posted driving speeds for users at a location, regular events at or near a location (e.g., annual parades), aggregate user demographics, aggregate user characteristics, aggregate accident statistics of the location, aggregate crime statistics for the location, and many more. Examples of sporadic characteristics include a specific event occurring on a particular day or at a particular time at a location (e.g., an accident, a temporary road, intersection, or onramp closure), an unexpected spike in traffic at a location (e.g., people or vehicles), current weather conditions at a location, unusual events or activity occurring at a location, and many more.

Explicit semantic characteristics correspond to explicit information, which may be explicit from a user, or explicit from a data source (e.g., a web page, document, file, yellow pages, maps, indexes, etc.) from which the information is extracted. As an example, explicit information can be extracted from data recording input by a user of likes and dislikes into a user profile corresponding to one of user profiles 222. As another example, the data could record a like from a "like button" on a social media site, which is provided to system 200. As another example, the explicit information could comprise a street name or route category extracted from a yellow pages or street atlas for a route component.

As indicated above, deeper understandings of users and routes are available to system 200 by extracting inferred semantic characteristics. Inferred semantic characteristics can be discovered by the system by making inferences from any of the information available to system 200. This includes any combination of the user and route data, as well as previously extracted explicit and/or inferred semantic characteristics of one or more users (e.g., the user), routes, and/or route components. In some implementations, inferred semantic characteristics can be updated over time as additional information is available for inferences. For example, the additional information may be used to determine that one or more inferred semantic characteristics no longer apply to one or more users or route components. This may be, for example, a result of changes in nature of the user or route component a result of system 200 having a better understanding of users, route components, or the world based on the additional information. In some cases, inferred semantic characteristics might additionally or instead be updated over time based on the information available to system 200 becoming stale or otherwise historical. Where inferred semantic characteristics change, any information based on the semantic characteristics could be updated.

In some cases, event tracker 216 can be utilized to assist in generating inferences by any of the various components in system 200. Event tracker 216 is configured to identify and track events and optionally routines of one or more users or route components from interaction data, such as user and route data. A "routine" (modeled routine) may be defined in terms of one or more recurring events that make up the routine. An "event" (modeled event) can correspond to one or more defined actions, behaviors, and/or activities that correspond to a user or route component that are detectable from user and/or route data and tracked by system 200.

Examples of events are the user driving, the user driving on a particular street, the user being in a particular geographic region or area, the user launching a route, the user interacting with a route, the user listening to a song or video, the user downloading a route, the user being at a geographic location, the user attending a meeting, reception of a sensor reading associated with the user, the user going to the gym, and the user being at work, the user accelerating above a threshold amount, the user making a turn in a particular direction in a vehicle, the user being with a particular person, the user being with family, the user being with kids, and the user being alone, amongst many more possibilities. These events may be identified by inference engine 212 using sensor data from a user device associated with the user. It is noted that one to all events can be associated with a routine. However, in many cases, an event may not be associated with a routine (e.g., an event may be detected as a one-time event).

Event tracker 216 can store any of the various data employed in tracking routines and/or events of users and routes and/or route components as user tracking data and route tracking data respectively (each can include event occurrence patterns, and/or other information inferred or discovered by system 200). Over time, event tracker 216 may update the tracking data as data is periodically analyzed and new events and routines are discovered, modified, or disassociated with users and routes and/or route components. One or more semantic characteristics of users and routes and/or route components can be inferred from the tracked data. Thus, it will be appreciated that semantic characteristics, such as driving patterns, driving conditions, and the like may also be updated and discovered based on the data. In some cases, the event tracking data includes records that store or otherwise indicate any of the various data associated with a routine and/or event, such as events of the routine and/or values associated with tracked variables of those events (e.g., various parameters such as a time stamp).

Tracked variables are event variables that are assigned and/or recorded by event tracker 216 with respect to a corresponding detected instance of an event. Values corresponding to the tracked variables may be stored in association with a user, route, and/or route component in the event tracking data. Tracked variables can correspond to any of a variety of user data or route data, examples of which have been described above and include sensor data or readings, which may be sensed by one or more sensors (such as information associated with a user device regarding location, position, motion/orientation, user-access/touch, connecting/disconnecting a charger, user activity on the user device, or other information that may be sensed by one or more sensors, such as sensors found on a mobile device) GPS coordinate samples, and many more.

It will be appreciated that values of tracked variables may be associated with one or more events and/or routines and need not be event or routine specific. An example of a tracked variable is a time stamp corresponding to a respective instance of the event, such as a drive on a street corresponding to a route component, that may be identified by inference engine 212, a usage or user interaction with a specific route, a usage location, or any of the various examples of events described herein. A time stamp can indicate the relative order or sequence of an instance of an event with respect to other instances of the event, and optionally instances of one or more other events of a corresponding routine.

As further examples of tracked variables, an event may comprise a user driving to a store. One tracked variable may correspond to an arrival location or venue, such as an arrival location name or venue name In detecting the event, event tracker 216 may infer the arrival as being satisfied based on user data comprising GPS data on the user's phone (e.g., user device 102*a* of FIG. 1), where the arrival location name or venue name is categorized as a store and stored based on interpretive data that includes map data used to associate coordinates from the user's phone with a corresponding location or venue name Thus, for one event instance, the name may be "Walmart," and for another instance, the name may be "Target," as examples. However, it will be appreciated that the level of granularity in the detection and tracking of events can vary. Thus, as an example, the name need not be a tracked variable. Furthermore, other examples of potential tracked variables, or more generally event variables, include arrival time (e.g., a time stamp), arrival location coordinates, driving speed, gas mileage, vehicle name, weather conditions, road conditions, information recording deviations from routes offered by a routing application, and many more.

Instances of events, such as events corresponding to user interactions, may be stored in association with an event instance record. Each event instance record can include any combination of a location or locations and a time stamp. The time stamp corresponds to a respective instance of an event and can indicate the relative order or sequence of the instance of the event with respect to other instances of the event, and optionally instances of one or more other events tracked within system 200. A location corresponds to a respective instance of an event and identifies a geographic area associated with the instance of the event (e.g., where the event occurred).

Generally a usage location can comprise any information suitable for system 200 to associate an instance of an event with a designated geographic area, such as those used in route components. An example of a usage location is a geo-point (e.g., geo-coordinates) that system 200 can determine is within the geographic area. Another example is an identifier of a geographic area or route, or route component. A further example is a route ID that system 200 can identify within a geographic area or tile. In some implementations, inference engine 212 optionally infers a route visit by a user in association with a user interaction and generates the usage location based on the identified route (or potentially identified candidate routes).

The location for an event instance record can optionally be based at least partially on one or more spatial samples, such as spatial-temporal samples. A spatial-temporal sample can correspond to data that identifies a specific event, user, and/or device at a location at a time. For example, a spatial-temporal sample can include a geographic location and a time stamp corresponding to the geographic location. Event tracker 216 could use the time stamp as the time stamp of an event instance record or could use it to generate that time stamp (e.g., a mean or median of multiple time stamps). The geographic location may include location coordinates, such as a latitude and longitude, and possibly measurement uncertainty information indicative of the accuracy of the geographic location.

Where spatial-temporal samples are provided by a sensor, such as a GPS receiver, the time stamp may be generated by the sensor, for example, at a time when a location is determined and/or measured by the sensor, along with its GPS coordinates. In some cases, the location data can be extracted from one or more user signals to provide a stream of location data that is aggregated into the location of an event. This can include using cluster analysis of the spatial-temporal samples and may consider other forms of location data and algorithms to arrive at a location for an event instance record.

While a GPS receiver is described, the location data used for determining a usage location can be at least partially extracted by data collection component 215 using any of a variety of approaches for determining a location of a user for an event and optionally a time corresponding to the location. In some implementations, for example, the location data can be generated using a Wi-Fi access point trace and/or a cellular trace. The user may be on user device 102a, which is capable of interacting with signals from the one or more Wi-Fi access points and/or cellular networks. Data collection component 215 may locate the user at least partially based on these interacting signals and generate the location data accordingly, such that event tracker 216 can use the location data to locate the user. As an example, the location data can be based on detecting one or more of those networks and could comprise one or more network names and/or network identifiers corresponding to the networks. Event tracker 216 can use the location data to map the networks to a location corresponding to the user or otherwise utilize information resulting from the interacting signals (e.g., optionally in combination with the spatial-temporal samples).

The data acquired by data collection component 215 on aggregate forms a detailed record of patterns of instances of events involving users and routes and/or route components. These patterns can provide understanding and knowledge to system 200 and can be identified and detected by the various components including event tracker 216, inference engine 212, and routing engine 260. For example, routing engine 260 may employ at least some of these patterns of instances of events in suggesting routes to users.

Routing engine 260 can leverage any combination of the various data described herein that is made available to system 200 by data collection component 215, as well as inference engine 212, in order to construct routes for users and/or select routes for users. In doing so, routing engine 260 can account for the various trade-offs in preferences that may be required to determine optimal routes for particular users. Many drivers have preferences for their preferred driving routes. In various implementations, routing engine 260 can account for these preferences, which may vary from user to user and based on other context (e.g., semantic characteristics of users and/or route components) surrounding a user request for a route. Furthermore, routing engine 260 can account for variation to the importance of these various factors from user to user. In doing so, routing engine 260 can construct routes for users and/or select routes for users while automatically managing the various trade-offs that come into play for particular users in determining which routes the users would prefer.

Routing engine 260 comprises route generator 250, route selector 252, and feedback analyzer 256. Routing engine 260 is configured to provide one or more suggested routes to users in response to a routing request. Feedback analyzer 256 is optionally included to analyze feedback from users on the suggested routes, which may be used to alter which routes are suggested to the users in the future.

Route generator 250 and route selector 252 are configured to provide suggested routes for users that satisfy various routing conditions that may be specified by the routing request. As used herein, a routing condition specifies a hard constraint on the routes that are suggested by routing engine 260. Routing conditions may be explicit from the user, or be inferred, such as from user context and/or context surrounding the routing request. For example, a user can configure one or more routing conditions in a route planning application (e.g., a GPS navigation app or web-based mapping app) using a user device, such as user device 102a. In some cases, menu options, toggles, and other GUI elements can be provided to the user for these purposes.

As an example, a routing request can include at least an ending location, which may be specified by the user using a user device (e.g., in a route planning application on the device). The ending location specifies a geographic ending for routes provided by routing engine 260 in response to a routing request. A routing request can further include a beginning location, which may be specified by the user using the user device or may be inferred from sensor data. The beginning location specifies a geographic beginning for routes provided by routing engine 260 in response to the routing request. In some cases, one or more intervening locations are provided for the routing request. Other examples of routing conditions are specific streets, intersections, or other routing components to avoid or include in suggested routes.

Further examples of routing conditions are streets, intersections, or other routing components to avoid or include in suggested routes based on having one or more specified semantic characteristic (e.g., rainy areas, high or low traffic areas, areas that have pot holes, areas with no construction, etc.). In some cases, a routing condition comprises a threshold value for one or more of the semantic characteristics and/or preferences, which a user may set or may be machine learned. When exceeded, the routing condition is satisfied and enforced on the routes suggested to the user. For example, a user may specify that there should be no more than two (threshold value) accidents in a route.

As another example, feedback analyzer 256 could determine the threshold value (e.g., using machine learning) by analyzing which routes the user selects when presented with multiple routes, and/or based on explicit feedback from the user (e.g., presentation component 298 could prompt the user with a message, such as on the user device, and analyze the user's response).

In addition to satisfying the routing conditions, route generator 250 and route selector 252 may be configured to provide suggested routes that satisfy one or more route preferences. Route preferences and routing conditions are more generally referred to herein as routing factors. Routing engine 260 can provide suggested routes based on routing factors 262, shown in FIG. 2. For example, route generator 250 can analyze the various routing factors associated with a routing request and generate one or more routes in response to the routing request based on the routing factors. Route generator 250 may select routing components that route the user from the beginning location to the ending location, or otherwise to locations based on those specified locations, by way of example.

A route preference herein refers to a soft constraint on the routes that are suggested by routing engine 260. For example, a routing condition could be that any routes suggested by routing engine 260 should not include a hill (e.g., an elevation change that exceeds a threshold value or a condition otherwise based on elevation change). A route preference could allow for the routes to include a hill, although route generator 250 and route selector 252 are less likely to provide routes that include a hill based on the soft constraint. By considering one or more route preferences and/or routing conditions in route planning, routing engine 260 can suggest more desirable routes to users.

Some route preferences may be general route preferences and other route preferences may be user route preferences. A general route preference refers to a route preference that is not specific to a particular user or users of system 200. An example of a general route preference is that on aggregate, users prefer to avoid or include a route component in routes, optionally under some designated context (e.g., when it's raining users tend to avoid a particular street). In contrast, a user preference refers to a route preference that is specific to at least one specific user of system 200, such as the user for which the route or routes are being generated. A similar example of a user route preference is that on a particular user prefers to avoid or include a route component in routes, optionally under some designated context (e.g., when it's raining this user tends to avoid a particular street).

In some implementations, at least some route preferences correspond to a preference weight metric which quantifies a level of strength in the route preference. The preference weight metric for a route preference can provide a preference weight for the route preference. Routing engine 260 can use the preference weight to factor in the route preference when generating and/or selecting routes for users. A preference weight may be higher for a route preference as the level of strength in the preference increases, causing the preference to have greater weight in providing routes to users.

Each metric described herein, such as a preference weight metric can correspond to one or more machine learning models. For example, each preference weight metric could correspond to a respective machine learning model. Thus the preference weights, as with other weights, can be machine learned. In some cases, a machine learning model can define inputs which collectively correspond to a route preference. For example, at least some inputs of a machine learning model can correspond to sensor data from one or more user devices provided in association with the user. This can include various inferred semantic characteristics (e.g., user characteristics 232).

Herein suitable machine learning models for machine learning can utilize supervised, semi-supervised, or unsupervised learning. Examples include hidden Markov models (HMMs), decision tree learning, ensembles, linear regression models, neural networks, nearest neighbor models, finite-state machine (FSM) models, logistic regression models, and support vector machine (SVM) models.

In some cases, routing engine 260 uses one or more preference weights to generate route scores, such as route scores 258. The route scores can be generated from a route metric that comprises preference weights from one or more preference weight metrics. A route metric can quantify an overall level of desirability of a corresponding route (or portion thereof) based on the one or more route preferences factored into the route metric. A route corresponding to a higher route score corresponds to a more desirable route than a route corresponding to a relatively lower route score. Routing engine 260 may be more likely to suggest routes that have higher route scores to users over those that have lower route scores, as will later be described in additional detail.

In some implementations, user preferences 230 comprise routing factors associated with users. For example, each routing profile may comprise routing factors for the user associated with the routing profiles. The routing factors associated with a user can be utilized by routing engine 260 to suggest routes for the user. In addition, or instead, one or more of the routing factors can be inferred or otherwise extracted from user preferences 230 and/or user characteristics 232.

In some implementations, whether routing engine 260 considers one or more routing conditions and/or route preferences in suggesting one or more routes is based on routing context, such as routing context 264. For example, the route metric utilized to generate and/or construct one or more routes in response to a routing request can be selected, constructed, or determined based on the context. In some cases, routing engine 260 uses the context to determine which preference weight metrics are included in the route metric. As another example, routing engine 260 selects a route metric that corresponds to the context.

In addition to, or instead of the forgoing, context can determine which version of a preference weight metric is applied to a route metric. In particular, the version of preference weight metric employed can vary based on context. As examples, based on routing engine 260 determining that a particular context applies to a route preference, routing engine 260 can select a preference weight for the preference weight corresponding to the particular context, or can adjust a base value of the preference weight using an adjustment factor corresponding to the particular context, and utilize the adjusted value to determine route scores.

The preference weights and/or adjustment factors can optionally be stored, for example, in user preferences 230 in association with one or more particular users. These values may form contextual profiles for users. Based on routing engine 260 identifying one or more context factors as applying to a routing request, routing engine 260 can utilize the one or more corresponding contextual profiles to suggest routes in response to the routing request. Utilize a context profile can comprise utilizing the contextual values and/or adjustment factors corresponding to that contextual profile to determine the preference weights applied to the routing metric.

Routing context 264 can comprise general routing context and/or user routing context. A general routing context refers to a routing context that is not specific to a particular user or users of system 200. In particular, when a general routing context applies to a routing request, the preference weights applied based on the general routing context that are used to determine which route or routes to suggest is not specific (customized) to a particular user or users of system 200. An example of a general routing context is one that is applied based on user characteristics 232 of a user indicating that the user is in a predefined age group. In contrast, a user routing context refers to a routing context that is specific to at least one specific user of system 200, such as the user for which the route or routes are being generated. An example of a user routing context is one that is applied based on the specific user that issued the routing request. Another example is one that is applied based on determining that one or more specific users will be using the suggested route or routes (e.g., driving in the same vehicle).

Routing context may indicate or otherwise correspond to a cause of or reason for a routing request. In some cases, routing context comprises one or more categorizations of the routing request. Inference engine 212, for example, may assign one or more predetermined categories to the routing request. The suggested routes can be tailored to the category or categories assigned to the routing request, and may be inferred from one or more semantic characteristics of the user. An assignment of a category may optionally be based on an analysis of the user data (e.g., aggregated user data and/or user data corresponding to the user) and/or interpretive data. Examples of predetermined categories for the nature of the routing request include running errands, leisure activities, working, eating out, exercising, getting coffee, or shopping. Thus, differing routes may be suggested to the user based on each of these categories.

Additional examples of routing contexts are those that correspond to a group of users, such as a family, a couple, or otherwise defined by a relationship. An example of a relationship is a family relationship. For example, a parent may desire to always or usually avoid high crime areas when driving with kids and may be more tolerant of those areas in the suggested routes when driving alone or only with another adult or a spouse. In some implementations, the relationship is inferred by inference engine 212. For example, the relationship can be inferred based on user characteristics 232. Routing engine 260 may utilize the corresponding context based on determining that the context applies to the routing request. As an example, routing engine 260 could determine that the routing context applies based on one or more user signals from the user and/or other users associated with the user (e.g., the users that are parts of the group). In some cases, this includes routing engine 260 determining that the members of a group are within a predefined distance of one another (e.g., based on device locations and/or identifying users by their voice or reference to users in audio from a user device). In some cases, the user may explicitly indicate that that the routing context applies, such as by using a setting in a route planning application.

Other examples of routing contexts are those that correspond to a time of day, a day of the week, a season of the year, or are otherwise temporally based. As an example, a user or users may be more willing to drive in high crime areas in the context of day as opposed to the context of at night. It will be appreciated that herein terms such as desire and willingness are analogues to levels of preferences, which can be manifested by the magnitude of preference weights used to suggest routes to users.

Further examples of routing contexts are those that correspond to a mode of transportation for the routing request, such as whether the user or users to implement a route is or will be walking, driving, running, sailing, or biking, as some examples. As an example, a user may be more willing drive on side streets as opposed to main streets while biking, as opposed to driving.

Additional examples of routing context are based on crow-sourced information from other users. Routing engine 260 can apply the routing context in generating routes for a user based on determining that the user is similar to the other users. For example, similarity can correspond to routing engine determining that the user shares one or more semantic characteristics with the other users. This can include, for example, drivers that routing engine 260 identifies as sharing similar routes to the user that has one or more similar preferences to the other users, or are otherwise determined and/or identified as being similar to the other users in some defined way. Additional examples include users that browse similar websites, make similar purchases, go to similar venues (such as restaurants), listen to similar music, drive similar vehicles, also have children, have similar social-media characteristics, or other user activity detectable and/or identifiable by routing engine 260.

In some cases, when a user identified as similar to other users, one or more preferences may be applied in route planning for the user from the other users that otherwise would not have been applied to the user. For example, the preferences may be identified by analyzing the preferences of the other users on the aggregate. As another example, the preferences of the other users can be utilized to determine preference weights for the user. This could, for example, be based on an average or other aggregate metric of a preference weight for the other users. In some cases user profiles 222 include one or more aggregate user profiles that can be utilized similar to user specific user profiles when the context applies to the user.

Routing context based on crow-sourced information from other users can be applied to any of the various user preferences described herein. This includes, as examples, preferences to avoid sunlight, or other weather conditions, to traverse main route components, to traverse familiar route components, to traverse scenic route components, to avoid hazardous route components, to avoid significant elevation changes such as hills, to traverse route components with better cellular reception, to traverse safer route components, and more. Thus, routing engine 260 can determine which route or routes are suggested in response to a routing request based on determining or identifying that one or more routing factors 262 apply to the routing request. As indicated above, when a route preference applies, a preference weight corresponding to the route preference may be incorporated into a route metric utilized to quantify the desirability of a route. Also described above, the preference weight utilized may further depend on routing context.

In some implementations, a route preference score may also be utilized that is generated from a preference metric. A preference metric corresponds to a preference score which quantifies a strength of a route preference for a route. In some implementations, for a particular route preference, a routing metric is utilized to determine a route preference score of the route preference and a corresponding preference weight is utilized to adjust the route preference score (e.g., to generate a weighted route preference score). The preference metric can be user agnostic and the preference weight metric be used to customize the route preference score to the user and/or routing request. Thus, a simple example of a route metric is R=P1(W1)+P2(W2)+P3(W3), where R is the route score, P1 is a route preference score of a first route preference for a route, P2 is a second route preference for the route, P3 is a third route preference for the route, W1 is a preference weight for the first route preference, W2 is a preference weight for the second route preference, and W3 is a preference weight for the third route preference.

In some implementations, a preference metric is applied to multiple road components in a route (e.g., each road component or each of a particular type, such as road type) to determine route preference subscore for the route component. The subscores are combined or otherwise incorporated into the preference metric to form the route preference score for the route preference. As an example, the preference metric could comprise an average, mode, min, max, or median of the route preference subscores of the route components that make up the route.

In some implementations, at least some route preference subscores are weighted in a preference metric. For example, each route preference subscore could be weighted based on the route component that corresponds to the route preference subscore. In some cases, weighting of a route component in determining a route score is based on a length, or distance of the route component. Routing engine 260 can be configured to weight longer route components more than shorter route components. Route component length can be determined utilizing any suitable manner, such as by referencing corresponding length data in route characteristics 228. The length data could be collected by data collection component 215 from any suitable source, such as mapping data.

In some cases, a machine learning model defines inputs which collectively correspond to a route preference subscore (e.g., a route preference subscore metric). For example, at least some inputs of a machine learning model can correspond to sensor data from one or more user devices provided in association with a route component. This can include various inferred semantic characteristics (e.g., route characteristics 228). Thus, weights for route preference subscores can at least partially be machine learned.

As another example, weighting of a route component in determining a route score can in addition or instead be based on an estimated time to travel over the route component for the route (i.e., how long it will take to traverse). Routing engine 260 can be configured to weight route components with higher estimated times to travel more than route components with lower estimated times to travel. Time to travel can be determined utilizing any suitable manner, such as by referencing corresponding time to travel data in route characteristics 228. In some cases, the time to travel is determined based on routing context (e.g., routing context 264), such as temporal information (e.g., time of day, time of year, etc.), weather conditions (e.g., rainy, snowy, icy, sunny, windy, etc.), accidents data (e.g., average accidents at the route component, current number of accidents at the route components, etc.), or other combinations of identified, estimated, and/or forecasted data.

In some implementations, the estimate time to travel is forecasted for a road component based on an estimated time of traversal of the route component (i.e., when the traversal is expected to happen). For example, routing engine 260 can determine the estimated time of traversal of the road component based on a starting time for the route, and one or more expected traversal speeds for the route prior to the route component. The expected traversal speeds or rates can be based on at least historical driving data of the user or users or assigned speed limits, and may also be based on other temporal data associated with the route (e.g., time of day, day of year, season, etc.). Using the expected traversal speeds, routing engine 260 can estimate a time of traversal for each route component and forecast conditions of the route component based on the time. When a driver begins a trip the conditions of a route component can vary dramatically when the driver actually reaches the route component. Thus, this approach can result in more accurate estimated times to travel for routes, as well as more accurate forecasting of road conditions (i.e., route characteristics), thereby improving the routes suggested to users.

Estimated times to traverse can in addition or instead be utilized to determine route preference subscores for a route preference score. For example, routing engine 260 can forecast the corresponding route preference of route preference subscores for one or more route components using an estimated time to traverse for one or more route components. As an example, routing engine 260 can determine that at 5 P.M. a route component is likely to have a high level of traffic or congestion based on historical data, resulting in a high route preference subscore for the route component. Assume that a user has a start time for a route of 3 P.M. and that the route component historically does not have much traffic at 3 P.M. Without the forecast, the route preference subscore will be lower, which can lead to a less desirable route being suggested for the user.

Having described examples of approaches for determining route score, such as route scores 258, examples of route selection and generation are provided below. In some approaches, route generator 250 optionally determines and utilizes route scores 258 to generate routes. For example, route generator 250 can analyze routes as they are being constructed (incomplete routes) and utilize route scores to determine which route components to include in the routes. In some cases, when generating one or more routes, route generator 250 excludes a route component from the one or more routes based on determining that the route component violates one or more routing conditions. This determination may be made by analyzing route characteristics 228. In some cases, a route preference subscore of the route component is utilized for this purpose. For example, the threshold value of a routing condition can be applied to the route preference subscore in the determination. Where the route preference subscore fails to conform to the threshold value, the route component may be discarded. However, it is noted that the threshold value need not be applied to the threshold value, and may be applied to any of various route characteristics 228 associated with the route component, forecasted or otherwise (e.g., routing engine 260 may estimate that that the speed of traffic flow will be 10 MPH on a route component where the threshold value corresponds to 25 MPH).

In some cases, route generator 250 outputs one or more suggested routes for the user. It should therefore be appreciated that in some cases, route selector 252 may not be needed. In other cases, route selector 252 may be employed to select one or more suggested routes from candidate routes (complete routes) generated by route generator 250. A complete route herein refers to a route which spans a specified beginning location and a specified ending location. Each candidate route and/or suggested route may span the same beginning and ending location. An incomplete route herein refers to a route which spans only one or more portions of the beginning location and the ending location.

While route generator 250 may consider route preferences and/or route scores in generating routes (e.g., by incorporating them into its optimization functions), in other cases, route generator 250 only optimizes for time and/or distance of routes. In these cases, route preferences can still be applied using route selector 252.

Where route selector 252 selects one or more suggested routes from candidate routes generated by route generator 250, route selector 252 can generate a route score for each candidate route. Various approaches to generating route scores have been described above, and can be employed by route selector 252, or more generally routing engine 260. A route metric may be applied to each route to generate a route score for each route. In some implementations, route selector 252 selects the highest scoring route and suggests the highest scoring route in response to the routing request. In other cases, route selector 252 a given number of the top routes and provides those routes as suggested routes in response to the routing request. One or more additional routes may optionally be included in the suggested routes, such as at least one route that is optimized (e.g., using an optimization function) for only time and/or distance, or one or more of the candidate routes that has the shortest the shortest time, distance, and/or combination thereof.

In some implementations, route selector 252 selects one or more candidate routes having the highest route scores and compares those routes to a reference route. The reference route may be, for example, a candidate route that has the shortest time, distance, and/or combination thereof. The shortest time, distance, and/or combination thereof can optionally be utilized as a suggestion reference. In some cases, route selector 252 selects one or more of the candidate routes based on the suggestion reference. For example, where a candidate route selected based on its route score has a time, distance, and/or combination thereof that exceeds the suggestion reference by a threshold amount, the candidate route may be discarded and/or the reference route may be included in the suggested routes. The threshold amount could correspond to a fixed amount (e.g., 5 minutes, 10 miles) or be a percentage of the suggestion reference (e.g., 10%), as examples.

Route selector 252 can additionally or instead apply a minimum threshold for one or more specific route preferences. For example, a route may be discarded based on one or more of the route preference scores (e.g., the weighted or unweighted preference scores) falling below the threshold value. In some cases, a route may be discarded during generation of a route score or prior to the analyzing the set of candidate routes, using this approach, thereby saving processing power.

Additional Examples of Route Preferences

An example of a route preference corresponds to a preference for main roads, or route components, for suggested routes. Main route components correspond to route components that on aggregate users traverse more frequently than non-main route components. Routing engine 260 can in some implementations quantify a frequency of traversal of one or more route components by an aggregation of users using a preference metric. In some cases, routing engine 260 determines the preference metric using traffic statistics, such as those that may be acquired by data collection component 215 from a department of traffic database, and/or from analyzing GPS data from user devices. As another example, mapping data can indicate which route components or portions thereof correspond to main roads, such as highways, side streets, side roads, and the like. The frequency can be extracted from this road type or other mapping data.

Another example of a route preference corresponds to a preference of a user to traverse one or more familiar route components. Familiar route components correspond to route components that on aggregate a particular user traverses more frequently than unfamiliar route components. Routing engine 260 can in some implementations quantify a frequency of traversal of one or more route components by the user using a preference metric. In some cases, routing engine 260 determines the preference metric using by analyzing GPS data from a user device associated with the user. As another example, routing engine 260 can analyze suggested routes accepted and/or traversed by the user. As a further example, familiarity may be explicitly indicated by the user (e.g., using the GUI of the user device).

A further example of a route preference corresponds to a preference to avoid one or more hazards and/or one or more particular hazards. Examples of hazards include inherent route component features, such as lane mergers, number of lanes, road condition (e.g., material condition such as bumpy, damaged, dirt, gravely), stop signs, stop lights, bike lanes, and the like. These features may be indicated in route characteristics 228, and data collection component 215 can update the route characteristics over time to reflect changing conditions.

Other examples of hazards include transitory route component features. Examples of transitory route component features include accidents, parked vehicles, and weather conditions. In some implementations, one or more transitory route component features can be reported from user devices, such as a user device associated with a different user than the user corresponding to the routing request. For example, the route planning application GUI may include a reporting interface that allows the user to specify any of the foregoing.

In some implementations, a route preference corresponds to a preference to avoid traveling in a direction of the sun (e.g., facing the sun). In some implementations, routing engine 260 determines whether or not a user would be traveling in a direction of the sun over a route component. This can be based on one or more of a user heading during traversal of a route component, historical sun location data, an estimated time of traversal of a route component, and an angle of incidence referenced to the sun and a location based on the route component (e.g., an expected location of the user during traversal). In some cases, the preference metric of the route preference corresponds to a degree of travel in a direction of the sun, which is calculated using any combination of the foregoing information (e.g., which varies based on the angle of incidence). The route preference score could be proportional to the degree of travel, as an example.

A further example of a route preference corresponds to a preference for cellular reception during routes. In some cases, the preference metric of the route preference corresponds to whether or not cellular reception is available over the route component. In addition or instead, the preference metric can correspond to signal strength over the route component. The route preference score could be proportional to the signal strength, as an example. Cellular reception can be determined, for example, from data (e.g., dropped call data, signal level data, etc.) generated by user devices during traversal of route components (e.g., while operating the route planning application or otherwise). As another example, cellular reception can be extracted by data collection component 215 from one or more coverage maps. As with other route component data described herein, these semantic characteristics may be stored and/or extracted from route characteristics 228.

A further example of a route preference corresponds to a preference for safer areas during routes. In some cases, a safer area for a route component is quantified by a preference metric in terms of crime rates. In addition or instead, a safer area for a route component can be quantified by a preference metric in terms of accident statistics. These statistics can be extracted, for example, by data collection component 215 from one or more databases and/or reported by users of system 200.

Additional Features

Suggested routes can be transmitted by routing engine 260 to one or more user devices, such as the device of a user that provided a route request. Suggested routes for a user, such as suggested routes 299, can be presented, for example, on any combination of user devices 102a through 102n. In this capacity, presentation component 298 can receive route suggestions from routing engine 260 and employ any of the various data shown with respect to user profiles 222 and route profiles 224, as well as other data. Presentation component 298 can determine when and/or how suggested routes are presented to a user. Presentation component 298 optionally requests route suggestions (and may provide one or more selection criteria, or routing factors, for suggestions as described above) or suggestions can be pushed to presentation component 298. In some embodiments, presentation component 298 comprises one or more applications or services operating on a computing device (such as computing device 600 described in FIG. 6 including a user device, such as a mobile computing device) or in the cloud. For example, presentation component 298 can be at least part of a route planning application, such as a GPS routing application on a user device (e.g., user device 102a).

Determinations made by presentation component 298 with respect to presenting routes can be utilized to assist the user, such as by requesting suggestions and providing routes to the user based on determining that the routes are relevant to user context, or refraining from providing one or more suggested routes to the user in certain contexts thereby reducing the utilization of network resources.

Suggestions may be presented to the user by presentation component 298 based on a specific routing request for suggestions from the user and/or a user device associated with the user, or may not be specifically requested. For example, in some cases, a user may request suggested routes using a GUI of the route planning application. As another example, suggestions could be pushed to a user device and presented actively or passively on the user device.

It will be appreciated that, in some cases, suggestions made by routing engine 260 and/or other constituents of system 200 may be provided to applications or services as a cloud service. In this regard, applications on user devices may optionally incorporate an application programming interface (API) for communicating with the cloud service and for providing at least some functionality of presentation component 298. In this way, a common framework may be provided to applications for tailoring routes to users. In other cases, routing engine 260 is located in the cloud. In others, one or more of the constituents thereof, such as route selector 252 and/or route generator 250 are location on a user device (e.g., as part of a route planning application thereon).

As indicated above, user feedback can optionally be incorporated into one or more routing metrics. Routing engine 260 can utilize feedback analyzer 256 to analyze the user feedback, such as by applying the feedback to update preference weights, user characteristics, route characteristics, and other inferences made by inference engine 212 using machine learning. In other words, any of the inferences made by inference engine 212 may utilize machine learning. Thus, feedback analyzer 256 can determine and/or updates preference weights for a user based on analyzing user data, such as interaction data of the user. For example, any of the various sensor data described above may be analyzed.

In some implementations, the feedback is provided from the user device, or route planning application that received the one or more routing suggestions. Feedback can comprise one or more of deviations from suggested routes during route traversal, acceptance of one or more suggested routes or one or more particular suggested routes from a list of suggested routes presented on the user device. As described above, in some implementations, presentation component 298 may prompt a user for user feedback. A prompt could be displayed on the user device, for example, based on determining that a preference weight exceeds a threshold value. Where the user confirms a route preference using the GUI, the preference weight can be increased and/or the preference weight can be activated for the user in route metrics utilized to suggest routes (e.g., to generate route scores). Where the user denies a route preference using the GUI, the preference weight can be decreased and/or the preference weight can be deactivated for the user in route metrics utilized to suggest routes.

In some implementations, the prompt, or message can be displayed based on the user accepting the route (e.g., "Why do you like this route," with selectable options that correspond to route preferences), based on the user presently traversing the route (e.g., "How are you enjoying this route," with selectable options that correspond to route preferences), or based on completion of the route (e.g., "How did you enjoy this route," with selectable options that correspond to route preferences).

In some cases, in presenting a suggested route on a user device, presentation component 298 displays one or more indicators of one or more route preferences of the route score used to select the suggested route. For example, indications may be provided for a number of the highest scoring one or more route preferences. An indication can comprise text and/or an icon that represents a route preference, as some examples.

It is noted that in some cases, a single route is suggested to the user and is automatically implemented in a route planning application on the user device. Implementing a route can comprise automatically initiating navigation functionality on the user device (e.g., GPS routing and tracking). In some cases, the single route may be suggested and/or implemented based on its route score exceeding a threshold value or otherwise based on an analysis of the suggested route. Thus, a user may issue a routing request, which automatically results in acceptance of a suggested route that conforms to the user's preferences.

Referring now to FIG. 3, a flow diagram is provided showing an embodiment of a method 300 for enhancing user efficiency in route planning Each block of method 300 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 310, method 300 includes identifying routing factors. For example, routing engine 260 can identify routing factors 262 based on a routing request associated with a user of user device 102*a*. The routing factors can include route preferences of the user, which may optionally be indicated in user preferences 230. The routing factors can also include one or more routing conditions, such as one or more of a beginning location and ending location for suggested routes.

At block 320, method 300 includes generating routes. For examples, route generator 250 can generate a plurality of routes based on the routing request. In some cases, route generator 250 generates the routes to conform to the routing conditions.

At block 330, method 300 includes determining preference weights for route preferences. For example, routing engine 260 can determine a preference weight of each route preference of the plurality of route preferences. Each preference weight can correspond to a machine learning model based on sensor data provided by one or more sensors in association with the user. In some cases, the preference weights are stored in user preferences 230 of a user profile of the user or at least some may be determined as needed. In some cases, user preferences 230 are determined using user characteristics 232, at least some of which may be inferred by inference engine 212. For example, semantic characteristics of the user may be inferred from user data obtained from any of the various sensors described herein.

At block 340, method 300 includes determining route scores of the routes based on the preference weights. For example, for each route of the plurality of routes, a route score of the route can be determined based on the preference weight of each route preference of the plurality of route preferences. These route scores may correspond to route scores 258. In some cases, the routes are incomplete routes, and route generator 250 utilizes the route scores to evaluate the incomplete routes in generating routes. In other cases, the routes may be complete routes and route selector 252 utilizes the route scores to determine which routes to suggest to the user.

At block 350, method 300 includes providing a suggested route based on the route scores. For example, routing engine 260 can provide a suggested route to user device 102*a* associated with the user. The suggested route can correspond to a selected route of the plurality of routes and be provided based on the route score of the selected route. In some cases, the selected route is provided by route generator 250. In others, route selector 252 selects the route from a plurality of routes generated by route generator 250. As described above, any number of routes may be provided the user as suggested routes. Each can correspond to one or more of the plurality of routes.

Referring now to FIG. 4, a flow diagram is provided showing one embodiment of a method 400 for enhancing user efficiency in route planning. At block 410, method 400 includes receiving a routing request from a route planning application. For example, routing engine 260 can receive a routing request from a user provided from a user interface of a route planning application. The route planning application may be running on user device 102*a*, which provides the routing request over one or more network communications. The user interface can be, for example, a GUI or other type of user interface, such as a text or voice based interface, or combination of these interfaces. The user can, for example, issue the routing request through interaction with the user interface. This can include selecting a submit button, which results in the routing request. Optionally, the user can specify one or more route conditions through interaction with the user interface. This can include a beginning location and/or ending location for suggested routes. In some cases, the route planning application is a navigation application, such as a GPS based navigation application. As another example, the route planning application could correspond to a browser based mapping application.

At block 420, method 400 includes identifying routing factors. For example, routing engine 260 can identify routing factors 262 based on the received routing request. Routing factors 262 comprise a plurality of route preferences of the user.

At block 430, method 400 includes generating routes. For example, route generator 250 can generate a plurality of routes based on the routing request.

At block 440, method 400 includes determining preference weights. For example, routing engine 260 can determine a preference weight of each route preference of the plurality of route preferences. Each preference weight can correspond to a machine learning model based on sensor data provided by one or more sensors in association with the user.

At block 450, method 400 includes determining route scores of the routes. For example, routing engine 260 can determine, for each route of the plurality of routes, a route score of the route based on the preference weight of each route preference of the plurality of route preferences. The route scores can correspond to route scores 258.

At block 460, method 400 includes selecting a suggested route based on the route scores. For example, route selector 252 can select a suggested route from the plurality of routes based on the route score of the suggested route. Route selector 252 can also select the suggested route based on a comparison between the suggested route and a reference route. In some cases, route selector 252 determines the reference route based on having the shortest estimated time to travel over the route amongst routes generated by route generator 250. As with each route, the reference route can optionally be generated by route generator 250 independently of route preferences. For example, route generator 250 could optimize for minimum estimated time to travel over the route, distance of the route, and/or a combination thereof. The routing preferences may then be considered in selecting amongst candidate routes from route generator 250 using the route scores. However, as noted above, at least some routes may be generated based on the route preferences.

The comparison can comprise, for example, comparing an estimated time to travel over the suggested route to a threshold value derived from a time to travel over the reference route (e.g., an estimated time to travel over the reference route). As noted above, the threshold value can be a percentage or fixed amount of the time to travel over the reference route. In addition or instead, the distance of the reference route can be compared to the distance of the suggested route using the threshold value or another threshold value. The suggested route can be selected based on the time and/or distance not exceeding the threshold value(s).

In some cases, one or more of the plurality of routes are discarded based on exceeding one or more of the aforementioned threshold values. Where one or more of the routes are deficient in this way, the reference route may be provided to the user as a suggested route. In some cases, reference route could be the only route suggested to the user in response to the routing request. For example, where no generated route can sufficiently be selected based on the route preferences, the reference route could be provided based on its estimated time to travel over the route. This could happen where no generated route is within the threshold value(s) for time and/or distance. As another example, each generated route may be deficient in some way with respect to one or more route preferences (e.g., at least one route preference score may not exceed a threshold value).

At block 470, method 400 includes transmitting the suggested route to the route planning application. For example, routing engine 260 can transmit the suggested route(s) to the user interface of the route planning application. The suggested route can be transmitted over or more network communications. By excluding deficient routes from the transmitting, network bandwidth can be saved. Furthermore, because the suggested route factors in the trade-offs in the route preferences using the preference weights, user efficiency is enhanced. For example, the user need not manually research route preferences to balance preferences or adjust way points of routes. In some cases, the user issues a routing request, and the suggested route is automatically provided in response to the routing request, with no further user interaction required. The suggested route can automatically be executed by a navigation application on the user device, as an example.

Figure 5:
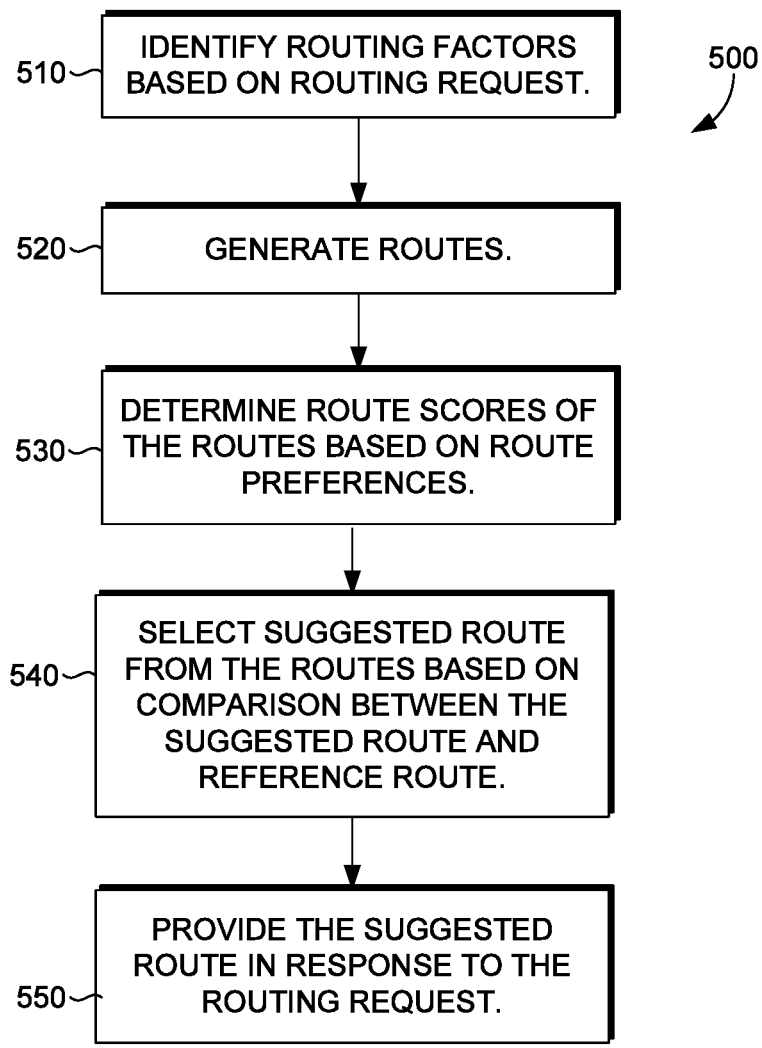
FIG. 5 is a flow diagram showing a method in accordance with implementations of the present disclosure.

Referring now to FIG. 5, a flow diagram is provided showing one embodiment of a method 500 for enhancing user efficiency in route planning. At block 510, method 500 includes identifying routing factors based on a routing request. For example, routing engine 260 can identify routing factors 262 based on the routing request. As with other implementations, the identification can optionally be based on routing context.

At block 520, method 500 includes generating routes. For example, route generator 250 can generate routes based on the routing request.

At block 530, method 500 includes determining route scores of the routes based on route preferences. For example, routing engine 260 can determine routes scores based on route preferences of routing factors 262. The route scores can be generated using any suitable approach.

At block 540, method 500 includes selecting a suggested route from the routes based on a comparison between the suggested route and a reference route. For example, route selector 252 can select the suggested route based on the route score of the suggested route. As described above, the reference route may optionally be generated by route generator 250, and could in some cases be the selected route (e.g., by having the shortest estimated time to travel of candidate routes).

At block 550, method 500 includes providing the suggested route in response to the routing request. For example, routing engine 260 can provide the suggested route, and optionally multiple suggested routes to the user. The suggested route may be displayed on a user device associated with the user.

Having described implementations of the present disclosure, an exemplary operating environment in which embodiments of the present invention may be implemented is described below in order to provide a general context for various aspects of the present disclosure. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 6 is merely illustrative of an exemplary computing device that can be used in connection with one or more embodiments of the present invention. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, implementations of the present disclosure provide for suggesting routes to users. The present invention has been described in relation to particular embodiments, which are intended in all respects to be illustrative rather than restrictive. Alternative embodiments will become apparent to those of ordinary skill in the art to which the present invention pertains without departing from its scope.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Embodiment 1

A computer-implemented method comprising: identifying routing factors based on a routing request associated with a user, the routing factors comprising a plurality of route preferences of the user; generating a plurality of routes based on the routing request; determining a preference weight of each route preference of the plurality of route preferences, each preference weight corresponding to a machine learning model based on sensor data provided by one or more sensors in association with the user; determining, for each route of the plurality of routes, a route score of the route based on the preference weight of each route preference of the plurality of route preferences; and providing a suggested route to a user device associated with the user, the suggested route corresponding to a selected route of the plurality of routes and being provided based on the route score of the selected route.

Embodiment 2

The computer-implemented method of embodiment 1, wherein the routing factors comprise a beginning location and an ending location, and each of the plurality of routes is a complete route that spans the beginning location and the ending location.

Embodiment 3

The computer-implemented method of any of embodiments 1-2, further comprising: generating a reference route independently of the plurality of route preferences; determining a threshold value based on the reference route; and selecting the suggested route for the transmitting based on a comparison between an estimated time to travel over the suggested route to the threshold value.

Embodiment 4

The computer-implemented method of any of embodiments 1-3, further comprising excluding a deficient route of the plurality of routes from being provided to the user device as the suggested route based on determining that at least one of an estimated time to travel over the deficient route, a distance of the deficient route, or a combination of the estimated time to travel and the distance exceeds a threshold value.

Embodiment 5

The computer-implemented method of any of embodiments 1-4, further comprising: generating a reference route independently of the plurality of route preferences, the reference route being optimized to minimize time to travel over the reference route; determining a threshold value based on the time to travel; and excluding a deficient route of the plurality of routes from being transmitted to the user device as the suggested route based on determining that an estimated time to travel over the deficient route exceeds the threshold value.

Embodiment 6

The computer-implemented method of any of embodiments 1-5, wherein the determining of the route score comprises: determining, for each route component of a plurality of route components of the route, a route preference subscore of the route component; combining the route preference subscore of each route component of the plurality of route components into a route preference score that represents the route preference; and applying the preference weight to the route preference score.

Embodiment 7

The computer-implemented method of any of embodiments 1-6, wherein the determining of the route score comprises: determining, for each route component of a plurality of route components of the route, a respective estimated time of traversal of the route component; forecasting, for each route component of a plurality of route components of the route, route characteristics of the route component based on the respective estimated time of traversal; and determining the route score from the forecasted route characteristics of each of the plurality of route components.

Embodiment 8

The computer-implemented method of any of embodiments 1-7, wherein a given route preference of the plurality of route preferences corresponds a preference for main route components that on aggregate users traverse more frequently than non-main route components.

Embodiment 9

The computer-implemented method of any of embodiments 1-8, wherein a given route preference of the plurality of route preferences corresponds a preference to traverse familiar route components that on aggregate the user has traversed more frequently than unfamiliar route components.

Embodiment 10

The computer-implemented method of any of embodiments 1-9, wherein a given route preference of the plurality of route preferences corresponds a preference to avoid one a hazard that corresponds to an inherent route component feature.

Embodiment 11

The computer-implemented method of any of embodiments 1-10, wherein a given route preference of the plurality of route preferences corresponds a preference for safer areas during routes that is based on crime statistics.

Embodiment 12

The computer-implemented method of any of embodiments 1-11, wherein a given route preference of the plurality of route preferences corresponds a preference based on cellular reception during routes.

Embodiment 13

A computer-implemented system comprising: a routing engine comprising one or more processors; one or more computer storage media storing computer-useable instructions that, when executed by the one or more processors, cause the one or more processors to perform operations comprising: identifying routing factors based on a routing request associated with a user, the routing factors comprising a plurality of route preferences of the user; generating a plurality of routes based on the routing request; determining a preference weight of each route preference of the plurality of route preferences, each preference weight corresponding to a machine learning model based on sensor data provided by one or more sensors in association with the user; determining, for each route of the plurality of routes, a route score of the route based on the preference weight of each route preference of the plurality of route preferences; and transmitting the suggested route to a user device associated with the user, the suggested route corresponding to a selected route of the plurality of routes and being provided based on the route score of the selected route.

Embodiment 14

The computer-implemented system of embodiment 13, wherein the method further comprises: generating a reference route independently of the plurality of route preferences; determining a threshold value based on the reference route; and selecting the suggested route for the transmitting based on a comparison between an estimated time to travel over the suggested route to the threshold value.

Embodiment 15

The computer-implemented system of any of embodiments 13-14, wherein a given route preference of the plurality of route preferences is based on identifying an elevation of a given route component of a plurality of route components of the route.

Embodiment 16

The computer-implemented system of any of embodiments 13-15, wherein a given route preference of the plurality of route preferences is based on determining a direction of travel over a route component of a plurality of route components of the route relative to the sun.

Embodiment 17

The computer-implemented system of any of embodiments 13-16, wherein the determining of the route score comprises: determining, for each route component of a plurality of route components of the route, a respective estimated time of traversal of the route component; forecasting, for each route component of a plurality of route components of the route, a weather condition (e.g., rain, wind, sun, etc.) of the route component based on the respective estimated time of traversal; and determining the route score from the forecasted weather characteristic of each of the plurality of route components.

Embodiment 18

One or more computer storage devices storing computer-useable instructions that, when used by one or more computing devices, cause the one or more computing devices to perform a method comprising: receiving, over one or more network communications, a routing request from a user provided from a user interface of a route planning application; identifying routing factors based on the received routing request, the routing factors comprising a plurality of route preferences of the user; generating a plurality of routes based on the routing request; determining a preference weight of each route preference of the plurality of route preferences, each preference weight corresponding to a machine learning model based on sensor data provided by one or more sensors in association with the user; determining, for each route of the plurality of routes, a route score of the route based on the preference weight of each route preference of the plurality of route preferences; selecting a suggested route from the plurality of routes based on the route score of the suggested route and based on a comparison between the suggested route and a reference route; and transmitting, over one or more network communications, the suggested route to the user interface of the route planning application.

Embodiment 19

The one or more computer storage devices of embodiment 18, further comprising selecting the reference route for the comparison based on an estimated time to travel over the reference route.

Embodiment 20

The one or more computer storage devices of any of embodiments 18 and 19, further comprising generating the reference route, wherein the reference route is optimized to minimize a time of travel over the reference route.

Embodiment 21

The computer-implemented method of any of embodiments 1-12, wherein the providing of the suggested route via the user device comprises one or more of displaying the suggested route on a user interface, providing turn-by-turn directions via the user interface, presenting the route on the user device, and providing the suggested route to a computer-controlled transportation vehicle.

What is claimed is:

1. A computer-implemented method comprising:
identifying routing factors based on a routing request associated with a user, the routing factors comprising a route preference of the user;
generating a plurality of routes based on the routing request;
determining a preference weight of the route preference, the route preference corresponding to a machine learning model that determines the preference weight based on aggregated user events extracted from sensor data provided by one or more sensors in association with the user;
forecasting a route characteristic corresponding to the route preference for each of a plurality of route components of a given route based on a respectively estimated time of traversal for the route component;
determining, for each route of the plurality of routes, a route score of the route based on the preference weight, wherein the route score of the given route is determined by weighting the route preference for each route component of the plurality of route components by the forecasted route characteristic of the route component;
selecting a suggested route from the plurality of routes based on the route score of the suggested route and based on a comparison between the suggested route and a reference route; and
providing the suggested route via a user device associated with the user, the suggested route corresponding to a selected route of the plurality of routes.

2. The computer-implemented method of claim 1, wherein the providing of the suggested route via the user device comprises one or more of displaying the suggested route on a user interface, providing turn-by-turn directions via the user interface, presenting the route on the user device, and providing the suggested route to a computer-controlled transportation vehicle.

3. The computer-implemented method of claim 1, further comprising:
generating the reference route independently of the route preference;
determining a threshold value based on the reference route; and
selecting the suggested route for the transmitting based on a comparison between an estimated time to travel over the suggested route to the threshold value.

4. The computer-implemented method of claim 1, further comprising excluding a deficient route of the plurality of routes from being provided to the user device as the suggested route based on determining that at least one of an estimated time to travel over the deficient route, a distance of the deficient route, or a combination of the estimated time to travel and the distance exceeds a threshold value.

5. The computer-implemented method of claim 1, further comprising:
generating the reference route independently of the plurality of route preference, the reference route being optimized to minimize time to travel over the reference route;
determining a threshold value based on the time to travel; and
excluding a deficient route of the plurality of routes from being transmitted to the user device as the suggested route based on determining that an estimated time to travel over the deficient route exceeds the threshold value.

6. The computer-implemented method of claim 1, wherein the forecasted route characteristic of each route component is represented as a respective value and the subscore of the route component is determined by combining the respective value with the preference weight.

7. The computer-implemented method of claim 1, comprising:
determining, for each route component of the plurality of route components of the given route, the respective estimated time of traversal of the route component based on a starting time for the given route and one or more expected traversal speeds for the given route prior to reaching the route component.

8. The computer-implemented method of claim 1, wherein the route preference corresponds to a preference for main route components that on aggregate users traverse more frequently than non-main route components.

9. The computer-implemented method of claim 1, wherein the route preference corresponds to a preference to traverse familiar route components that on aggregate the user has traversed more frequently than unfamiliar route components.

10. The computer-implemented method of claim 1, wherein the route preference corresponds to a preference to avoid one a hazard that corresponds to an inherent route component feature.

11. The computer-implemented method of claim 1, wherein the route preference corresponds to a preference for safer areas during routes that is based on crime statistics.

12. The computer-implemented method of claim 1, wherein the route preference corresponds to a preference based on cellular reception during routes.

13. A computer-implemented system comprising: one or more computer memory storing computer-useable instructions that, when executed by one or more processors, cause the one or more processors to perform operations comprising:
identifying routing factors based on a routing request associated with a user, the routing factors comprising a route preference of the user;

generating a plurality of routes based on the routing request;

determining a preference weight of the route preference, the route preference corresponding to a respective machine learning model that determines the preference weight based on aggregated user events extracted from sensor data provided by one or more sensors in association with the user;

forecasting a route characteristic corresponding to the route preference for each of a plurality of route components of a given route based on a respectively estimated time of traversal for the route component;

determining, for each route of the plurality of routes, a route score of the route based on the preference weight, wherein the route score of the given route is determined by a respective subscore of each route component of the plurality of route components, the subscore being based on the forecasted route characteristic of the route component;

selecting a suggested route from the plurality of routes based on the route score of the suggested route and based on a comparison between the suggested route and a reference route; and transmitting the suggested route to a user device associated with the user, the suggested route corresponding to a selected route of the plurality of routes.

14. The computer-implemented system of claim 13, wherein the method further comprises:

generating the reference route independently of the route preference;

determining a threshold value based on the reference route; and selecting the suggested route for the transmitting based on a comparison between an estimated time to travel over the suggested route to the threshold value.

15. The computer-implemented system of claim 13, wherein the route characteristic is determined based on identifying an elevation of a given route component of plurality of route components of the given route.

16. The computer-implemented system of claim 13, wherein the route characteristic of each route component is determined by determining a direction of travel over the route component relative to the sun.

17. The computer-implemented system of claim 13, comprising:

determining, for each route component of the plurality of route components of the given route, the respective estimated time of traversal of the route component based on a starting time for the given route and one or more expected traversal speeds for the given route prior to reaching the route component.

18. A computer navigation device comprising a user interface, one or more processors, and one or more computer memory storing computer-useable instructions that, when executed by the one or more processors, cause the one or more computing devices to perform a method comprising:

extracting user events from sensor data provided by one or more sensors of one or more devices in association with a user;

updating a machine learning model using the extracted user events, the machine learning model corresponding to a route preference of the user and being configured to determine a preference weight based on aggregated user events extracted from sensor data provided by the one or more sensors in association with the user, the updating incorporating the extracted user events into the aggregated user events thereby altering the preference weight;

receiving, via the user interface, a routing request from a user;

identifying routing factors based on the received routing request, the routing factors comprising the route preference of the user;

generating a plurality of routes based on the routing request;

determining the preference weight using the updated machine learning model;

forecasting a route characteristic corresponding to the route preference for each of a plurality of route components of a given route based on a respectively estimated time of traversal for the route component;

forecasting, for each route component, of the plurality of route components, a respective time to travel over the route component based on the respectively estimated time of traversal for the route component;

based on an estimated time to travel over the route component;

determining, for each route of the plurality of routes, a route score of the route based on the determined preference weight, wherein the route score of the given route is determined by weighting the route preference for each route component of the plurality of route components by the forecasted route characteristic of the route component and by the forecasted respective time to travel over the route component;

selecting a suggested route from the plurality of routes based on the route score of the suggested route; and providing the suggested route via the user interface.

19. The one or more computer storage devices of claim 18, further comprising selecting the reference route for the comparison based on an estimated time to travel over the reference route.

20. The one or more computer storage devices of claim 18, further comprising generating the reference route, wherein the reference route is optimized to minimize a time of travel over the reference route.

* * * * *